Dec. 29, 1964 TAKEO MATSUZAKI 3,163,716

MULTI-CHANNEL PHASE SHIFT CODE TRANSMISSION SYSTEM

Filed June 8, 1961 2 Sheets-Sheet 1

*Inventor*
T. Matsuzaki
By Arthur M. Lieberman
AGENT

MULTI-CHANNEL PHASE SHIFT CODE TRANSMISSION SYSTEM

Filed June 8, 1961 2 Sheets-Sheet 2

Inventor
T.Matsuzaki

By

AGENT

United States Patent Office 3,163,71

Patented Dec. 29, 19

3,163,716

MULTI-CHANNEL PHASE SHIFT CODE TRANSMISSION SYSTEM

Takeo Matsuzaki, Tokyo, Japan, assignor to Nippon Electric Company, Limited, Tokyo, Japan, a corporation of Japan Filed June 8, 1961, Ser. No. 115,708
Claims priority, application Japan, July 7, 1960, 35/30,755
6 Claims. (Cl. 178—66)

This invention relates to high-speed code transmission utilizing phase shift, and in particular a phase discrimination carrier communication system by the so-called phase shift system wherein sinusoidal or cosine waves are used to convey the data of the independent channels.

One object of this invention is to provide a high speed code transmission system, utilizing phase shift, wherein carrier wave phase synchronization is achieved between the send and receive station.

Another object of this invention is to provide an improved multi-channel telegraph system whereby the bandwidth necessary to transmit and receive a pair of channels is considerably reduced.

Of the three equi-spaced phase vectors of an ordinary carrier wave, this invention uses two split-phase carrier waves for two channels and the other split-phase carrier wave for phase synchronization. The amplitude of the transmitted wave is always constant, and a stably synchronized carrier wave is reproduced at the receiving end regardless of the obstacles in the transmission channel.

The above mentioned and other features and objects of this invention and the manner of attaining them will become more apparent and the invention itself will best be understood by reference to the following description of an embodiment of the invention with several alternative arrangements of parts taken in conjunction with the accompanying drawings wherein:

FIG. 1(*a*), (*b*), (*c*), (*d*), and (*e*) shows vector diagrams of the inventive concept;

FIG. 2(*a*) and (*b*) is schematic block diagrams of the send and receive circuitry respectively;

Figures 3, 4, 5, 6:
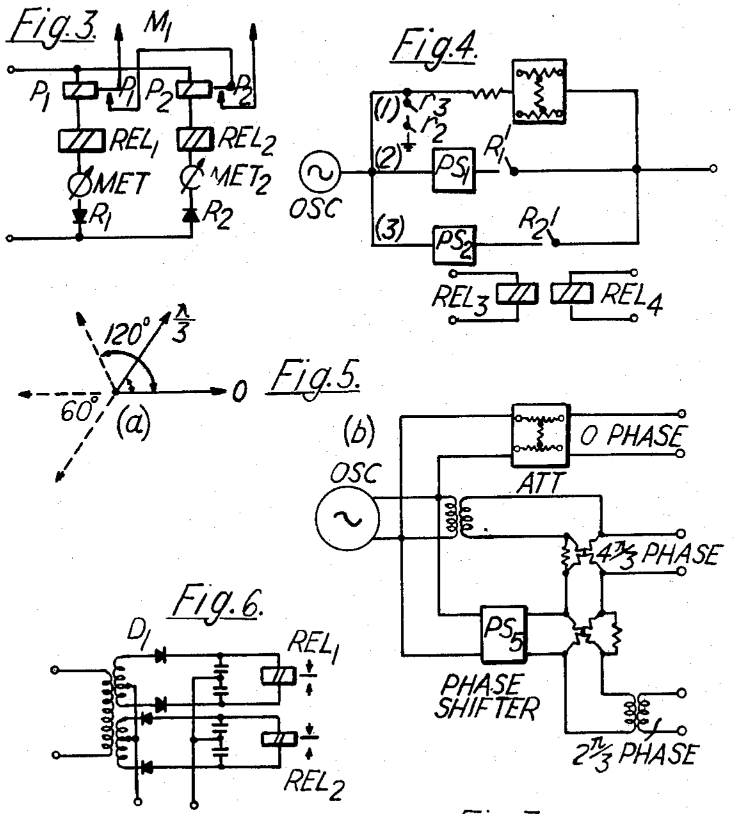
FIG. 3 shows an alternative arrangement of the relays in the output stage of the receiver (FIG. 2*b*)
FIG. 4 illustrates an alternative arrangement for the modulators of the transmitter (FIG. 2*a*)
Figure 7:
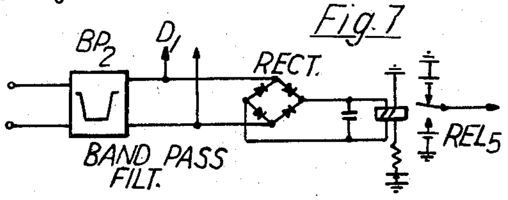

FIG. 5(*a*) and (*b*) shows an alternative arrangement for generating the three phase vector carrier wave;

FIG. 6 illustrates an alternative arrangement in the receiver (FIG. 2*b*) using two sets of balanced modulators; and FIG. 7 shows an alternative arrangement in the receiver for evaluating the condition where the receiving current is zero.

Figure 1:
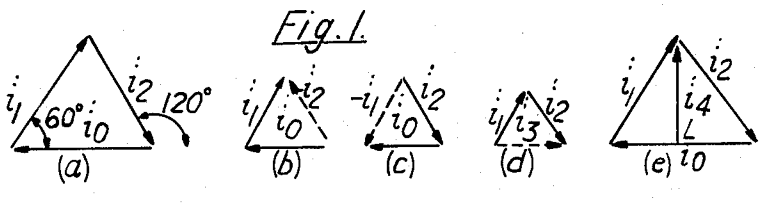

FIG. 1(*a*) shows the three-phase vector diagram of an ordinary carrier wave; $i_0$, $i_1$, and $i_2$ represent the zero phase, the $2\pi/3$ phase, and the $4\pi/3$ phase vector, respectively. Let $i_1$ and $i_2$ be the two-channel carrier waves, which are independently modulated with digital code information of the amplitudes 1 and 0. If $i_0$ is always transmitted, it is obvious, from the nature of the three-phase vectors, that the transmission vector becomes $i_0+i_1=-i_2$ (when $i_1$ is present) or $i_0+i_2=-i_1$ (when $i_2$ is present) as shown by (*b*) and (*c*) of FIG. 1 and that the magnitudes of the latter vectors are equal to $|i_0|$.

If neither $i_1$ nor $i_2$ is transmitted, the transmitted vector is obviously the $i_0$ carrier wave itself. As will be described later, this is utilized to generate the correct synchronizing carrier wave.

Since $i_1+i_2+i_0=0$, the transmitted vector would be zero and no carrier wave would be sent during the simultaneous communication of $i_1$ and $i_2$. Therefore, in t case, no distinction could be made at the receiving e whether the transmission channel is faulty or busy. Ho ever, if a fourth vector $i_3=-i_0$, a vector having t reversed phase of $i_0$, such as shown in FIG. 1(*d*) transmitted, the magnitude of the transmitted vector w always be same as $|i_0|$ whether during communicati or not. Consequently a D.C. output of constant amplitu is obtained only when the synchronizing carrier wa at the receiving end is in phase with $i_0$, and the outp will be on-offed when it is in phase with either vec $i_1$ or $i_2$. Conversely, when the received wave is dem ulated by a synchronizing carrier wave of any phase a an output of constant magnitude is obtained, it mea that the phase of that carrier wave is either in phase in reverse phase with $i_0$ of the sending end, and it follo that a completely synchronized carrier wave is rep duced. Although the system of this invention is a plicable to general code communication systems such telegraphy, PCM, and IDP, telegraph modulation w be explained in detail hereunder for convenience sake.

Figure 2:
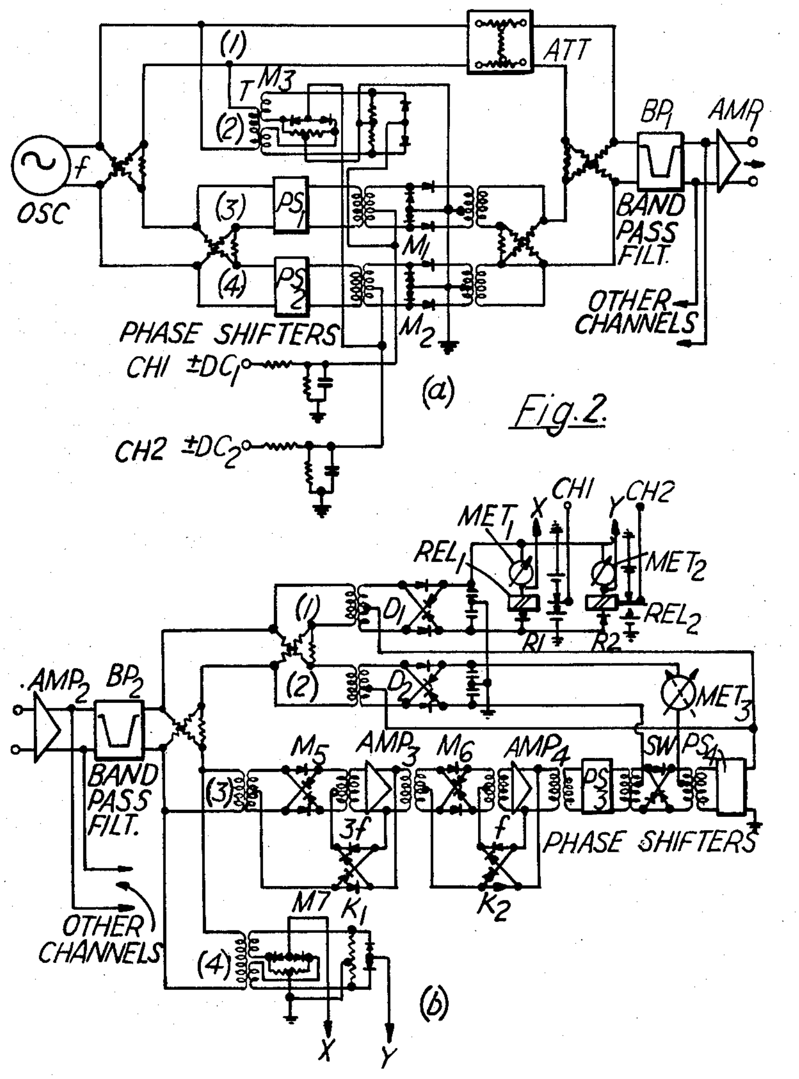

FIG. 2(*a*) shows a transmitting station embodying t features of this invention. An oscillator OSC genera the zero phase of the carrier wave *f* which in turn divided into four branches. It is here assumed that of these branches have the same transmission loss a that the phase-shift due to the modulator is practica zero. The carrier wave *f* is applied: to the output throu an attenuator ATT, by the branch (1); to a switch c cuit $M_3$ for short-circuiting the input of (1) by t branch (2); to a modulator $M_1$ after being phase-shift by $2\pi/3$ through a phase shifter $PS_1$ by the branch ( and to a modulator $M_2$ after being phase-shifted $4\pi/3$ through a phase shifter $PS_2$ for the branch ( $M_1$ and $M_2$ are ordinary on-off modulators for te graph usage; $M_3$ is an on-off circuit which when it ceives the D.C. codes $DC_1$ and $DC_2$ (when two chann $CH_1$ and $CH_2$ are communicating simultaneously) sho circuits or opens two sets of variable impedances in t secondary side of a transformer T and consequently terrupts the carrier wave at ATT cutting off the outp of the branch (1). In other words, while $CH_1$ a $CH_2$ are communicating simultaneously, only the wa of $2\pi/3$ and $4\pi/3$ phase, modulated by $M_1$ and M are transmitted and the vector carrier wave $i_3$ which given by $i_1+i_2=i_3=-i_0$ and shown in FIG. 1(*d*) is tra mitted. The magnitude of this vector is equal to |

While $CH_1$ and $CH_2$ are communicating individual since only one of the two variable impedances is un a short-circuited condition and the other is left at hi impedance, $M_3$ is essentially under an open conditi and the output of (1) is normally produced on the outp side through ATT.

Therefore, it is obvious that, only the carrier wave $2\pi/3$ phase (if only $CH_1$ is communicating), or only t carrier wave of $4\pi/3$ phase (if only $CH_2$ is commu cating), passes through $M_1$ or $M_2$ and is added to t direct current carrier wave of (1), forming the mo lated wave of the vector shown in FIGS. 1(*b*) or ( by the dotted lines.

In other words, it is shown that, whether $CH_1$ and C are communicating or not, the carrier wave of the mo ulated wave is represented by one phase of the reve phase of the three-phase vectors shown in FIG. 1( Therefore, the wave may be deprived of the unnecessa side band wave by $BP_1$, amplified by an amplifier AM and sent to the transmission channel. The techni merits of this system lie in that, notwithstanding its pha shift modulation wave, the communication capacity twice as large as that of a carrier communication syst using the conventional dual side band transmission syste that high speed communication is possible, and in ad· tion the amplitude is constant and synchronism is surc :d stable.

Now the receiving end station of this system will be scribed with reference to FIG. 2(*b*), wherein the receiv- g wave is amplified to the required output level by an ıplifier $AMP_2$, and the required frequency passed by e band-pass filter $BP_2$, and then divided into four anches.

Branch (3) is the synchronizing carrier wave genera- r circuits, (4) is the short-circuit switch circuit for (3) in FIG. 2(*a*), and (1) and (2) are demodulating cir- its. One of the three phase carrier wave vectors is ways applied with the same amplitude to the input of ). If the frequency of the input carrier wave be multi- ied by three and then by ⅓ by the two-stage feedback vider circuit consisting of modulators $M_5$ and $M_6$, recti- rs $K_1$ and $K_2$, and amplifiers $AMP_3$ and $AMP_4$, it is parent that, assuming the input wave to be $$i=a_0\sin\omega t+a_1\sin\left(\omega t-\frac{2\pi}{3}\right)+a_2\sin\left(\omega t-\frac{4\pi}{3}\right)$$

(zero phase carrier wave $\sin\omega t$)

'here, as mentioned above, either one or two of $a_0$, $a_1$, are always zero, and $a_0=a_1=a_2$), the first stage triple :quency output due to $M_5$ and $K_1$ is, filtering out the ıer unnecessary frequencies, $$i'=a'_0\sin 3\omega t+a'_1\sin(3\omega t-2\pi)+a'_2\sin(3\omega t-4\pi)$$
$$=a_1\sin 3\omega t$$

d that the ⅓ demultiplied frequency output due to $M_6$ d $K_2$ is consequently of a constant amplitude and a con- .nt and zero phase and is given by $$i'=a'_1\sin\omega t$$

Furthermore, it is well known that, if $AMP_3$ and $AMP_4$ : placed under oscillating conditions with their gains fficiently large, the original oscillation phase is main- ned, even if the input of (3) is interrupted for a short ıe.

Since the synchronizing carrier wave is given to de- ›dulators $D_1$ and $D_2$ of the branches (1) and (2) ·ough a variable phase shifter $PS_3$, a reversing switch / and a 90°-phase shifter $PS_4$, a constant positive or gative D.C. may be obtained, whether communicating not, by regulating the synchronizing carrier wave phase th $PS_3$ in conjunction with meter $MET_3$ (which reads : D.C. output demodulated by $D_2$). When the above nstant is achieved, $PS_3$ is in phase with the zero or ›hase of the transmitted carrier wave. If $PS_3$ is in phase th $i_1$ or $i_2$, it follows that an interruption occurs, and ıt $MET_3$ is not constant. The meter $MET_3$ may be in : form of a high sensitivity D.C. meter, a pair of volt- : indicating neon tubes, or the so-called magic eye licator. If an ordinary D.C. meter is employed, the flection will show 0.75 which is the mean value of one lf and unity of the full scale, in response to zero phase :rier, whereas the deflection will show −0.125 which the half of the difference of 0.75 and unity, in response $\pi$-phase carrier. Such deflection shows whether the :eiving end station is in phase or not, as is described .ow. In any case, deflection of the meter $MET_3$ shows an operator that the carrier is being received by the re- ving device. In case no deflection is produced in the ter $MET_3$, the receiving end station is not receiving any ·rier signal.

Thus, when $PS_3$ is determined, it is possible to discrimi- :ively operate the two relays $REL_1$ and $REL_2$ corre- ›nding to $CH_1$ and $CH_2$ by using the carrier wave whose ıse is shifted by $\pi/2$, and then demodulated by $D_1$, and passing a D.C. code current in the circuits in which atively reversed rectifiers $R_1$ and $R_2$ at the relays $REL_1$ l $REL_2$ respectively are connected in series, and to re- ›duce a divided current at the local circuit.

The principle on which the synchronous demodulation is possible will be explained hereunder.

While $i_1$ and $i_2$ are communicating independently, the demodulated outputs $i_5$ and $i_6$ of $D_2$ due to the carrier wave in phase with or in reversed phase with $i_0$ in the circuit for generating the synchronizing carrier wave of (3) are $$i_5=\pm 2i_1\sin\omega t=\pm 2a_1\sin\left(\omega t-\frac{2\pi}{3}\right)\sin\omega t$$
$$=\pm a_1\cos\frac{2\pi}{3}=\mp\frac{a_1}{2}\text{ (D.C. component only)}$$

and $$i_6=\pm 2i_2\sin\omega t=\pm 2a_2\sin\left(\omega t-\frac{4\pi}{3}\right)\sin\omega t$$
$$=\pm a_2\cos\frac{4\pi}{3}=\mp\frac{a_2}{2}\text{ (D.C. component only)}$$

Both are simultaneously in phase or in reversed phase with the sending end D.C. code. Therefore, if the D.C. output due to $D_2$ is read with $MET_3$ while $i_1$ and $i_2$ are communicating independently, and if, for instance, SW is assumed to be in correct position for positive readings, then, if $MET_3$ is negative, the D.C. output of $D_2$ is re- versed by reversing SW, to give the output of the phase shifter $PS_4$ the correct $\pi/2$ phase shift. Thus, a carrier wave of a correct phase is given to $D_1$.

When $i_1$ and $i_2$ are simultaneously communicating a part of the code current on the relays $REL_1$ and $REL_2$ is taken out from terminals XY shown in the drawings, and ap- plied to the corresponding terminals XY of a short-cir- cuit switch $M_7$ of the branch (4) in view of the danger of the carrier wave of $D_2$ becoming in phase with $i_3$, and with a view to cutting off the input of (3). This done, $M_7$ operates in the same manner as $M_3$ in the sending end to short-circuit the input of (3). Assume that $AMP_3$ and $AMP_4$ have large gains and are under a normal oscilla- tion condition in phase with $i_0$, the carrier wave having the previous phase impressed to $D_1$ as it is. This separates the next output of $D_1$ even though $CH_1$ and $CH_2$ may be obtained simultaneously. The demodulated output $i_5$ and $i_6$ due to $D_1$ become as follows, due to the crossing carrier wave $i_4$ shown in FIG. 1(*e*).

$$i'_5=\pm 2i_1\sin\left(\omega t-\frac{\pi}{2}\right)=\pm 2a_1\sin\left(\omega t+\frac{2\pi}{3}\right)$$
$$\times\sin\left(\omega t-\frac{\pi}{2}\right)=\pm\frac{\sqrt{3}}{2}a_1\text{ (D.C. component only)}$$

and $$i'_6=\pm 2i_2\sin\left(\omega t-\frac{\pi}{2}\right)=\pm 2a_2\sin\left(\omega t-\frac{4\pi}{3}\right)$$
$$\times\sin\left(\omega t-\frac{\pi}{2}\right)=\mp\frac{\sqrt{3}}{2}a_2\text{ (D.C. component only)}$$

Thus, if one is positive, the other is negative. There- fore, it is possible, due to the polarities of $R_1$ and $R_2$, to determine the readings of the meters $MET_1$ and $MET_2$ so that $REL_1$ if $i'_5$ is positive, and $REL_2$, if $i'_6$ is negative, may independently operate. This is possible because the sending end modulation is a single current. Whereas, by the well-known phase reverse modulation, the phase of the output code is not determined, because $a_1$ and $a_2$ themselves become positive or negative.

In other words, it is possible to make the phase of the carrier wave generation circuit $i_0$ when $CH_1$ or $CH_2$ is receiving communication, and to separate them to $REL_1$ and $REL_2$, respectively, for reception. If neither $MET_1$ or $MET_2$ operates and only $MET_3$ operates, then $MET_3$ is in the reverse direction, and it is necessary, in order to reverse SW manually, to interrupt the input (3) so as to make $REL_1$ and $REL_2$ operate. If none of the meters work, there is a fault in the line, and it is necessary to wait until the line is restored before sending the carrier wave $i_0$ from the sending end for the initial phase synchronizing.

In the receiving relay circuit of FIG. 2 (*b*), it is also possible as shown in FIG. 3 to use, besides the polarized relays $REL_1$ and $REL_2$, a set of relays $P_1$ and $P_2$ so as to use their contacts simultaneously.

Furthermore, since these relays are not suitable for a high-speed communication such as PCM, they may be replaced by the well-known flip-flop circuit or a regenerative repeater circuit. Consequently, SW of FIG. 2 (*b*) can be switched with the flip-flop output.

Next, as shown in FIG. 4, the modulators of FIG. 2 (*a*) may be replaced by two sets of relays $REL_3$ and $REL_4$ which perform the same operation in case of telegraph.

In other words, assuming that contacts $r_3$ and $r_4$ are operated by their respective relays, the first channel transmits the carrier wave of $2\pi/3$ when only REL 3 operates, and the second channel, that of $4\pi/3$ when only $REL_4$ operates. Thus, if simultaneous communications are being performed, the resultant output of branches (2) and (3) is transmitted and branch (1) is short-circuited to perform the same function as FIG. 2(*a*).

It is also possible as shown in FIG. 5 (*b*) to generate the three-phase vector carrier wave by using only one phase shifter $PS_5$ of $\pi/3$ phase. This is because, as shown in FIG. 5 (*a*), the carrier wave is obtained by combining the zero phase, the resultant of the reverse phase and the $\pi/3$ phase, and the reverse phase of the $\pi/3$ phase, and the amplitude is regulated by the attenuator.

Furthermore, the rectifiers $R_1$ and $R_2$ of FIG. 2 (*b*) can be omitted by, as shown in FIG. 6, using two sets of balanced modulators in opposite directions as the demodulator $D_1$ in the receiving end.

Alternatively, it is also possible to determine the direction of current only with $R_1$ and $R_2$ by using non-polarized relays for $REL_1$ and $REL_2$ of FIG. 2 (*b*) and to discriminate $CH_1$ and $CH_2$.

According to the modulation system of this invention, the zero phase carrier wave $i_0$ is always transmitted except while $i_1$ and $i_2$ are simultaneously communicating, here $i_0$ is interrupted and $-i_0=i_5$ is transmitted, but conversely, if $i_0$ is always transmitted from the sending end, the receiving carrier wave is zero during the simultaneous communication, because $i_1+i_2+i_3=0$. Hence, a receiving method can be worked out in which the above is utilized to add a constant D.C. code when the receiving current is zero.

That is, as shown in FIG. 7, if the output of the band pass filter $BP_2$ is rectified by a rectifier RECT to operate a relay $REL_5$, whose biasing current is regulated so as to reverse the mark and space, then a double current is obtained from the local circuit, which can be superposed on the contact circuits of $REL_1$ and $REL_2$ of FIG. 2 (*b*).

Again, the multiplier and the divider circuit of the synchronizing carrier wave generation circuit can maintain, even during the instantaneous interruption of the input carrier wave or during simultaneous communication of $i_1$ and $i_2$, the carrier wave phase $i_0$ during the previous independent communication, by using the well-known magnetic reactor frequency divider, parametron frequency dividers, or a triple multiplier and one-third divider circuit comprising a blocking oscillator, and tuning fork oscillator.

Again, if only one channel of $i_1$ or $i_2$ is transmitted, only two phases of the three-phase vector are utilized and the amplitudes of the transmitted vectors are constant.

In any case, since the transmission vector during the time when $i_1$ or $i_2$ is communicating, is $i_0+i_1=-i_2$ or $i_0+i_2=-i_1$ as previously stated, and is equal to the reversed phase vector of the other, the required phase shifted wave is obtained by merely replacing the carri wave vector of the modulator by $i_1$ or $i_2$ and reversing tl phase. In this case, the output of the branch (1) FIG. 2 (*a*) becomes unnecessary.

While I have described above the principles of m invention in connection with specific apparatus, it is to l clearly understood that this description is made only l way of example and not as a limitation to the scope my invention as set forth in the objects thereof and the accompanying claims.

What is claimed is:

1. A code transmission system for providing two binai code signal channels on separate phases of a single fr quency three phase carrier wave, the third phase of whic serves as a synchronizing channel, comprising means provide three phase carrier frequency wave, means f keying two phases of said wave on-and-off in accordan with binary signals of individual channels, and means f keying off the third of said phases in response to simu taneous keying on of said two phases.

2. A system according to claim 1 further comprisi means to receive said three channels, a filter for selecti waves of the frequency of said carrier, means for genera ing a frequency synchronous with said third phase response to said selected waves and means responsive said synchronous wave for discriminating the binai signals of said two channels.

3. A phase shift code transmission system for use wi two multichannel binary inputs of single-current syste comprising: a transmitter including means for produci three phase sinusoidal carrier signals of a single frequenc and coupling means for applying said three phase signa onto a common line, said coupling means comprisi means for switching on-and-off two of the three pha signals in response to said binary inputs, respectively, a means for continuously sending out the remaining one the three phase signals as a synchronizing signal for r ception: a receiver for each of said binary input signa comprising a band-pass filter rejecting all save said sing frequency means for generating a receiving synchronizi signal synchronous with said remaining one of the thr phase sigals; and means for reproducing said bina signals in response to said receiving synchronizing sign and the received three phase signals, said means compri ing a phase discriminating means including a pair parallel oppositely polarized relays coupled to the inp of said receiver and a combination of D.C. indicati means associated with said relays for discriminating tl two of the three phase signals with reference to said r ceiving synchronous signal.

4. A phase shift code transmission system as claim in claim 3 in which the three phases are 120° apart a the third phase is at 0°.

5. A phase shift code transmission system as claimed claim 3 in which the means for generating a sign synchronous to the third phase comprises a frequen multiplier of three and a frequency divider of thr coupled thereto.

6. A phase shift code transmission system as claim in claim 3 in which the means for discriminating tl digital information includes a pair of parallel opposite polarized relays coupled to the input of the receiver a the synchronous signal generating means.

References Cited in the file of this patent

UNITED STATES PATENTS

| | | |
|---|---|---|
| 2,491,810 | Guanella | Dec. 20, 19 |
| 2,750,566 | Westcott et al. | June 12, 19 |
| 2,786,100 | Earp | Mar. 19, 19 |
| 2,979,566 | Hopner et al. | Apr. 11, 19 |
| 3,037,079 | Crafts | May 29, 19 |